March 19, 1968 A. REIMBERT 3,373,536
SILO OR TANK COMPRISING SEVERAL COMPARTMENTS OR CELLS
Filed Sept. 24, 1964 6 Sheets-Sheet 1

March 19, 1968 A. REIMBERT 3,373,536
SILO OR TANK COMPRISING SEVERAL COMPARTMENTS OR CELLS
Filed Sept. 24, 1964 6 Sheets-Sheet 2

Inventor
André Reimbert
by Michael J. Striker

March 19, 1968      A. REIMBERT      3,373,536
SILO OR TANK COMPRISING SEVERAL COMPARTMENTS OR CELLS
Filed Sept. 24, 1964      6 Sheets-Sheet 3

Inventor
André Reimbert
by
Michael J. Striker

March 19, 1968 A. REIMBERT 3,373,536

SILO OR TANK COMPRISING SEVERAL COMPARTMENTS OR CELLS

Filed Sept. 24, 1964 6 Sheets-Sheet 4

Inventor
André Reimbert
by Michael J. Striker
Atty

March 19, 1968

A. REIMBERT 3,373,536

SILO OR TANK COMPRISING SEVERAL COMPARTMENTS OR CELLS

Filed Sept. 24, 1964

Inventor
André Reimbert by Michael J. Striker

United States Patent Office 3,373,536
Patented Mar. 19, 1968

3,373,536
SILO OR TANK COMPRISING SEVERAL
COMPARTMENTS OR CELLS
André Reimbert, 67 Blvd. de Reuilly, Paris, France
Filed Sept. 24, 1964, Ser. No. 398,943
Claims priority, application France, Sept. 25, 1963,
948,571; Apr. 23, 1964, 971,974
13 Claims. (Cl. 52—234)

This invention relates to silos, tanks or like containers and has specific reference to a container of this character which comprises a plurality of cells or compartments, the inner separating or dividing partitions consisting of prefabricated sheet-metal panels partially or completely corrugated or pleated in the horizontal direction, the outer wall or main enclosure of the structure consisting on the other hand either of a continuous concrete wall of conventional construction or of vertical stackings of horizontal reinforced concrete angle-members bearing on one another edgewise with their longitudinal edges so that in vertical cross-section the stacking has a zigzag contour, an alternate arrangement of the outer wall consisting of pleated or corrugated sheet-metal elements or panels similar to those of said separating or dividing partitions, said vertical stackings of concrete angle members of the outer wall as well as the pleated or corrugated metal panels of said dividing partitions or peripheral walls being separated from one another by concrete posts constituting their end supports, whereas in the case of an enclosure consisting of a conventional concrete wall the dividing partition panels are supported internally by concrete posts and externally by the concrete mass of said continuous concrete wall.

It is the essential object of this invention to provide a novel method of constructing works of this character whereby the structural elements can be prefabricated in workshops remote from the site of erection of the works, these elements being so designed that they comprise not only means for fastening the partitions and walls to the posts or to the continuous concrete wall, but also reinforcements for the future posts or the continuous concrete wall and possibly the whole or part of the shuttering for casting said posts and/or said wall, whereby, when these elements are assembled on the site, it is only necessary to cast the concrete to form the posts and/or the continuous wall and provide an integral structure.

According to this invention, this object is attained in practice by the fact that the connection between the metal panels and the concrete mass of the posts or of the continuous wall of the peripheral enclosure is obtained by using projecting hook-shaped horizontal reinforcing bars welded beforehand on the ends of said prefabricated panels, said reinforcing bars being adapted to anchor at least partially the metal panels in the concrete mass of the posts or the continuous wall of the peripheral enclosure cast subsequent to the erection of the structure framework.

According to a specific form of embodiment, said reinforcing bars welded on the ends of said prefabricated panels are connected, for example by welding, to vertical bars adapted to constitute the reinforcements of said concrete posts or concrete peripheral wall which are cast subsequent to the erection of the structure framework, other reinforcements for example in the form of horizontal polygons, closed or not, being secured, if desired, for example by welding, around said vertical bars.

According to a modified form of embodiment the metal panels are assembled with the posts or continuous peripheral wall of the concrete enclosure by using horizontal polygonal elements, closed or not, connected to projecting hook-shaped horizontal reinforcing bars welded beforehand to the side ends of said panels.

Other features and advantages of this invention will appear as the following description of different forms of embodiment of the invention proceeds with reference to the accompanying diagrammatic drawings, in which:

FIGURES 1–12 illustrate a typical construction wherein the outer or peripheral wall of the silo or like enclosures consists of stacked concrete angle members, and more particularly—

Figure 1:
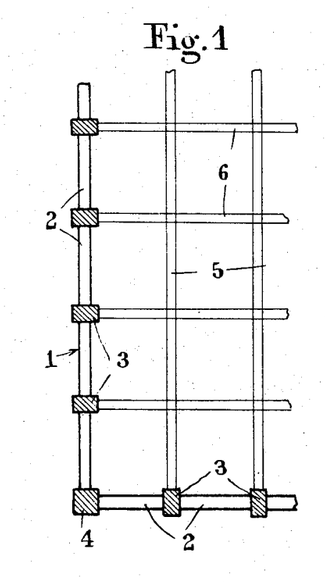
FIGURE 1 is a fragmentary horizontal section of the structure.

In the horizontal diagrammatic fragmentary section of FIGURE 1 the external enclosure of the silo 1 (which is shown in thick lines) comprises elementary walls 2 consisting in the known manner of stacked prefabricated angle members superposed horizontally and edgewise by their marginal edges in opposite directions so as to form in vertical cross section a so-called zigzag contour wall, the successive stackings being separated by vertical concrete posts 3 and at the corner of the enclosure by corner posts 4 to which said stackings are connected by means to be explained presently.

The internal partitions (shown in thin lines) comprise in this example metal panels consisting partially or wholly of horizontally corrugated or pleated sheet metal elements 5 disposed across other metal panels 6 of same construction, the crossing between the two series of panels being obtained through known means and the internal metal panels being secured to the intermediate posts 3 in the manner set forth hereinafter.

Figure 2:
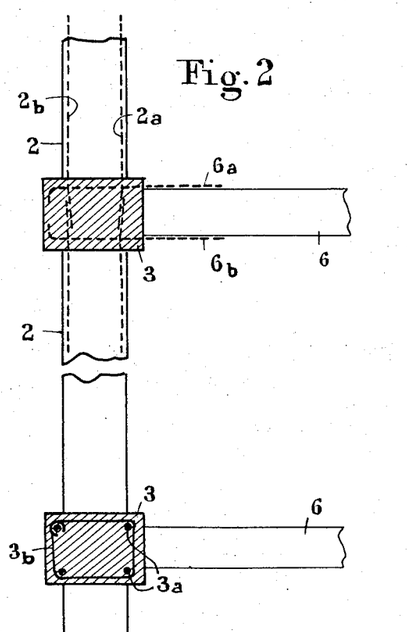
FIGURE 2 is a section similar to FIGURE 1 but taken on a larger scale.

As shown in FIGURE 2, the external angle-member elementary walls 2 are fastened to the intermediate posts 3 by means known per se such (as shown in broken lines in this figure) as longitudinal reinforcing bars 2a, 2b extending the ones within the junction edges of the various angle members (not shown), the others along the edges of the flanges of said angle members, these reinforcing bars further extending into the post concerned adjacent the similar extensions of the corresponding reinforcing bars from the angle members of the external wall element located on the other side of the same post.

Figure 3:
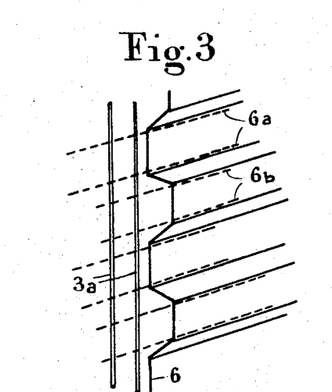
FIGURES 3 and 4 are a fragmentary perspective view and a corresponding plane view of a detail at one end of a corrugated or pleated sheet-metal panel.

As to the metal panels 6, as shown in FIGURES 2 and 3 and according to a specific feature of this invention, they comprise reinforcing bars 6a, 6b secured on the various corrugations of each panel and extending into the relevant post as shown in broken lines in the figures.

Figure 5:
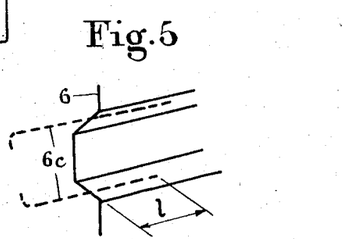
FIGURES 5 and 6 are respectively similar views of a modified form of embodiment.
Figure 6:
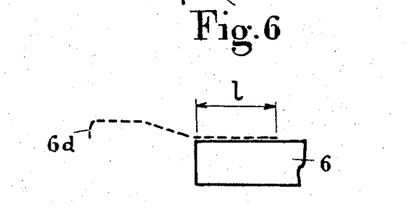

These reinforcing bars 6a, 6b are secured preferably on the vertical faces of the corrugated sheet-metal elements and their number per face is immaterial; however, as shown in FIGURE 5, reinforcing bars 6c may also be provided on the inclined faces of these corrugations and secured like the reinforcing bars 6a, 6b, or substituted for bars 6b. These reinforcing bars 6a, 6b and/or 6c may be strictly rectilinear but, as shown in FIGURE 6, their free ends may if desired be bent to provide a hook or like anchoring portion 6d. The reinforcing bars inherent to post 3 are not shown in the upper portion of FIGURE 2, but they are visible in the lower portion of this figure and also in the perspective view FIGURE 3. They consist of a number of vertical bars 3a, this example showing four bars.

Figure 4:
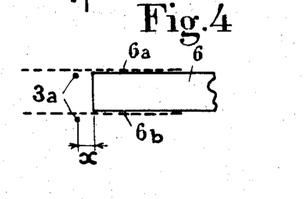

If desired, at least one reinforcing bar 3a may be provided at either end, this or these bars extending in a direction strictly parallel to the transverse edge of the corrugated sheet-metal panel. If more than one reinforcing bar 3a is provided, as shown by way of example in FIGURES 2 to 4, these bars may be fastened to one another at spaced intervals by using clamps, collars or ferrules 3b, the distance x measured from each bar to the transverse edge of the sheet metal element or panel being variable. These bars may have any desired and suitable cross-sectional contour and any desired and suitable position relative to the adjacent metal panels. They may also be secured on the aforesaid bars 6a, 6b, 6c by any suitable means, notably by welding. In this case they play a very important role. They firstly constitute a very useful vertical stiffening element preventing the corrugated sheet from contracting or expanding accordionwise during handling and assembling operations. Furthermore, upon completion of the assembling steps and casting of the concrete vertical post, these bars constitute at least some of the vertical bars of the post concerned. It may also be noted that the bars 6a, 6b and 6c may also constitute reinforcing frames of the concrete posts and, as shown in FIGURE 7, the posts may comprise both vertical bars 3a and the collars 3b inherent thereto, and vertical bars 3c welded to the reinforcing bars 6a, 6b, 6c of the adjacent metal panels.

Figure 7:
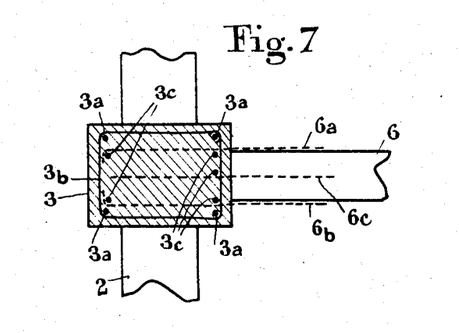
FIGURE 7 is a horizontal section showing an alternate form of embodiment of the post.

Regarding the form of embodiment illustrated in FIGURE 7, reference may be made to the mode of erection contemplated for the compound structure according to this invention. Basically, this assembling operation is effected by commencing with the metal walls which are subsequently used as guide means for laying the prefabricated reinforced-concrete angle members. The reinforcing bars of these angle members may actually engage the vertical bars 3c to which they can subsequently be fastened, if desired.

Figure 13:
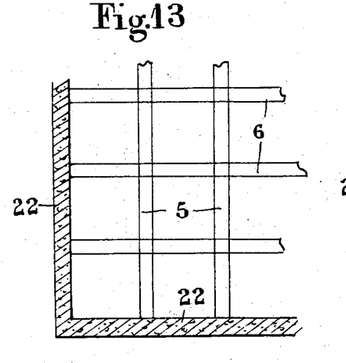
FIGURE 13 is a horizontal section similar to FIGURE 1 but concerning an enclosure made of cast concrete according to the conventional technique.
Figure 14:
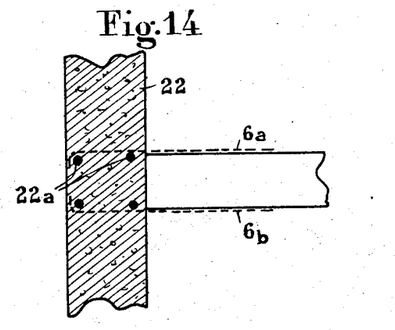
FIGURE 14 is a horizontal section similar to FIGURE 13 but taken on a larger scale.

FIGURES 13 and 14 prove clearly that the metal panels 5, 6 may be connected in a similar way to a continuous wall 22 made according to the conventional concrete casting technique, by means of their reinforcing bars 6a, 6b welded on the vertical reinforcing bars 22a of said wall.

Figure 8:
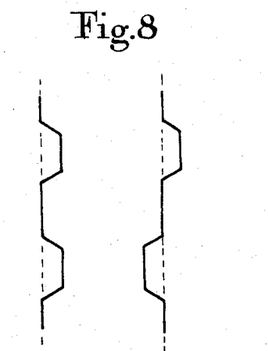
FIGURE 8 shows different sectional contours of corrugated sheet-metal panels suitable for the purposes of this invention.

Regarding the metal panels of which the new means according to this invention for connecting same to the reinforce-concrete posts constituting part of the external enclosure of the silo or reservoir have just been described, they may have any desired cross-sectional contours, notably those shown in FIGURE 8. In plane view, these panels may be rectilinear if the containers to be constructed are of polygonal configuration, or curved if the containers are of cylindrical or oval configuration.

Figure 9:
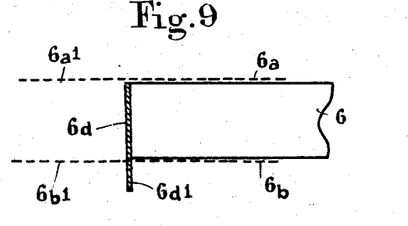
FIGURES 9 to 12 illustrate metal panels comprising a transverse plate or section at their ends.

On the other hand, it is known that panels made from corrugated, pleated or bent sheet-metal stock may be completed by means of a plate 6d secured endwise by any suitable means, preferably by welding, and constituting a more or less partial shuttering for casting the concrete of the post extending normally to this panel. Of course, if, as shown in FIGURE 9, this plate 6d exceeds the panel width, it will be perforated or notched to permit the passage of the new reinforcing bars 6a, 6b or 6c added to the exterior of these corrugations and formed with extensions $6a^1$, $6b^1$ adapted to be embedded in the concrete mass of the corresponding post.

Figure 10:
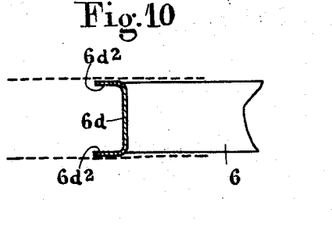
Figure 11:
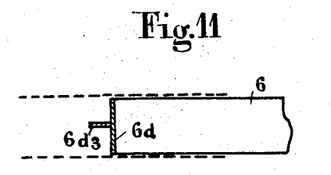

This plate 6d may be completed by flanges $6d^2$ along its two edges (FIGURE 10) or along only one edge (FIGURE 9) at $6d^1$; one or more similar flanges may also be provided on the edge of projection $6d^1$ (FIGURE 9), or alternately one or more fins or like members such as $6d^3$ extending continuously or not vertically, may be provided with a view to complete the fastening of each panel 6 with the concrete mass of the corresponding post against which the plate 6d is caused to abut. Of course, the angle formed between this plate 6d and the plane of the relevant panel depends on the shape of the compartment to be obtained.

Figure 12:
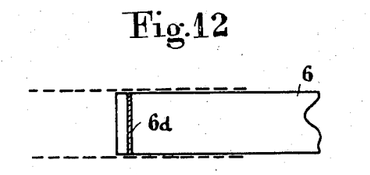

The plate 6d may also be cut according to the contour of the corrugated or pleated sheet of the panel so as to be secured about one or two inches from the edge of this sheet, inside the hollows. With this arrangement shown diagrammatically in FIGURE 12 the panel sheet may be caused to project somewhat into the concrete mass of the post, and elements 6d will still serve as shuttering means for casting the concrete post.

As to the antidynamic tube or tubes of the silos or tanks according to this invention, which as already known per se may be manufactured in the form of prefabricated sections and advantageously mounted against the external reinforced-concrete walls of the silo or like container, they are erected preferably against a vertical side face specially provided for this purpose in the corner posts or even in the intermediate posts of the external wall of the work. Thus, reliable supports will be available for securing these tube sections, to which they can be rigidly fastened by means of collar-like reinforcing bars projecting from the concrete mass of the bearing face of the posts concerned. These antidynamic tubes may be made of reinforced concrete but also of metal since the position of the internal components located within the mass of the siloed material avoids any oxidation thereof.

Finally, regarding the construction of the crossings between the inner metal partitions, it has already been stated hereinabove that this problem could be solved by resorting to known means. However, if it is contemplated to apply at these cross points a technique similar to that described hereinabove in connection with the assembling of the internal metal partitions with the reinforcing-concrete posts of the external concrete wall, the form of embodiment illustrated in FIGURES 15 and 16 of the drawings may advantageously be adhered to.

Figure 15:
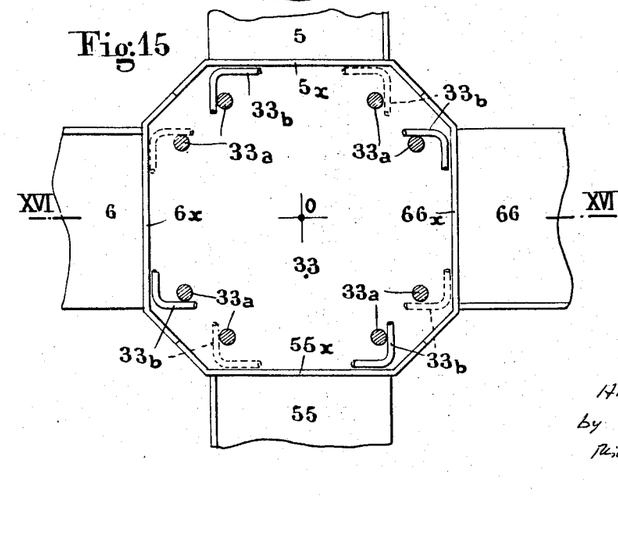
FIGURES 15 and 16 are respectively a plane view showing a cross point between four inner metal partitions of the type illustrated in FIGURE 1 and fragmentary vertical section taken upon the line XVI—XVI of FIGURE 15.
Figure 16:
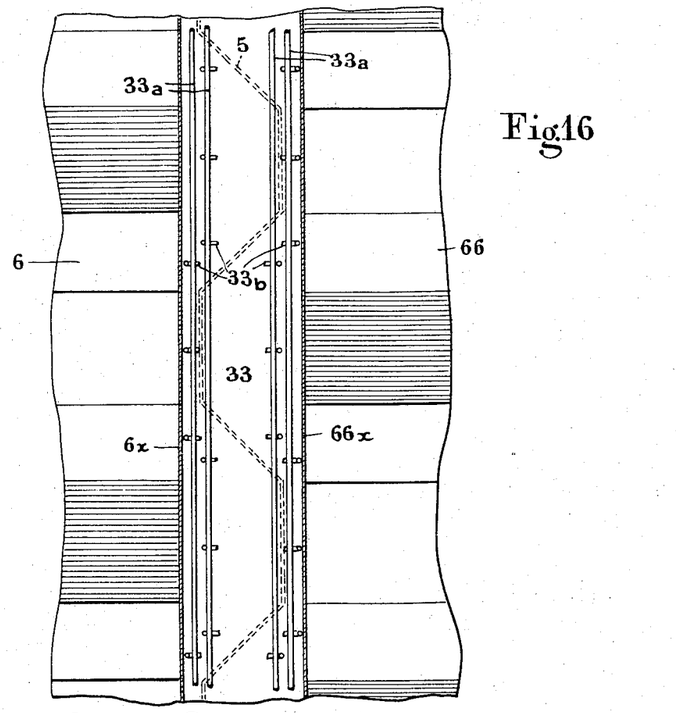

By analogy with FIGURE 1, the metal walls illustrated in FIGURE 15 are vertical upper and lower partitions 5 and 55, respectively, and horizontal left-hand and right-hand partitions 6 and 66, respectively. However, these partitions are assumed to consist each of a corrugated panel having horizontal corrugations as shown in broken lines in FIGURE 16, all the panels having the same dimensions. Their inner ends are also equally spaced from the center O, and each panel has secured across its inner end, preferably by welding, a transverse trough-shaped plate 5x, 55x (in the case of panels 5 and 55) and 6x, 66x (in the case of panels 6 and 66), respectively. These tough-shaped end plates are adapted to be joined in abutting relationship, as shown in FIGURE 15, to constitute a shuttering for casting the eight-sided concrete post 33. Of course, reinforcing bars or like irons (not shown), secured longitudinally at the corresponding end and externally of each corrugation, for example as illustrated in FIGURES 2 and 7, have extensions projecting into the concrete mass of post 33 provided in turn with inherent vertical reinforcing bars or irons 33a as well as horizontal transverse members frames or collars 33b disposed at different levels and preferably welded to the vertical reinforcing bars 33a and also if desired to the end portions of the longitudinal reinforcing bars of said metal panels.

FIGURES 17 to 23 illustrate another form of embodiment of this invention which departs from the preceding ones in that the same group of cells or compartments comprising separating or dividing partitions made from sheet-metal elements corrugated partially or completely in the horizontal direction are surrounded by an external enclosure consisting of metal walls of same type as said internal partitions, the different component elements of this enclosure being still separated by concrete posts having a metal sheathing.

Figure 17:
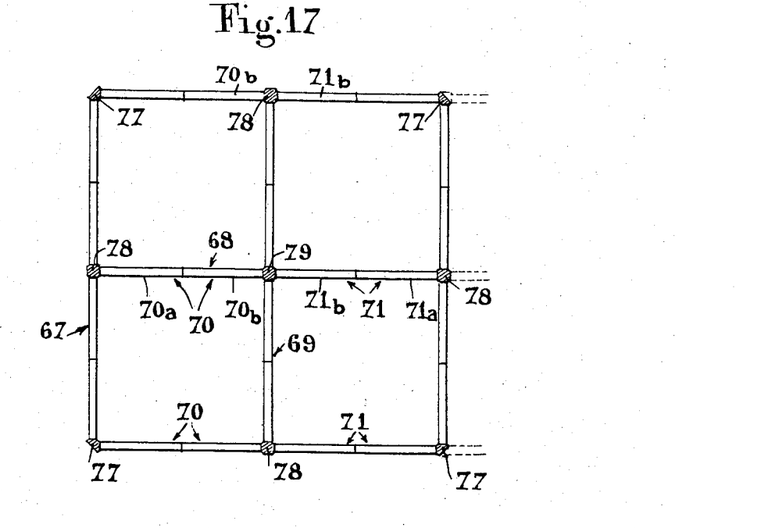
FIGURE 17 is a fragmentary diagrammatic plane view of a silo constructed according to the teachings of this invention, with the posts shown in cross-section, the main wall being assumed to consist of metal panels like the inner dividing partitions.
Figure 18:
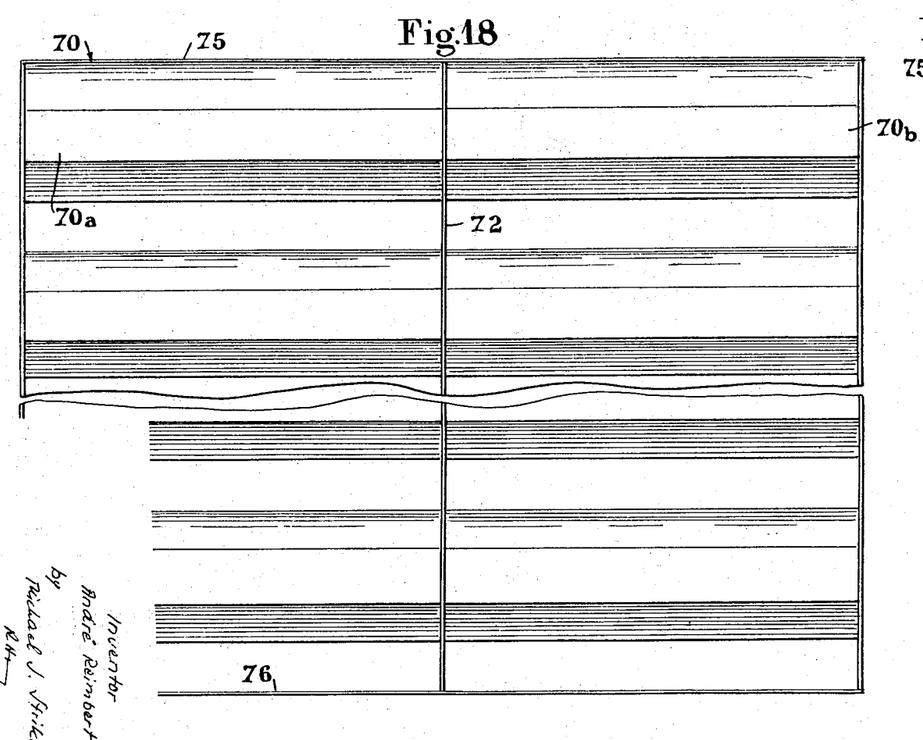
FIGURES 18 and 19 are respectively a front elevational view and fragmentary vertical cross section of a wall-forming panel.
Figure 19:
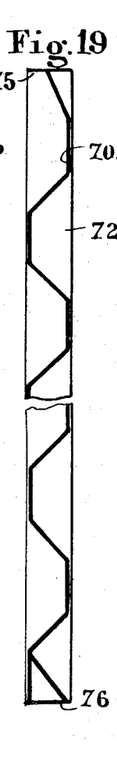

As shown diagrammatically in FIGURE 17, the structure illustrated consists of a square enclosure 67 and a pair of dividing partitions 68, 69 crossing each other at right angles and constituting with said enclosure a group of four cells or compartments. All the walls consist of two vertical panels 70, 71 constituted by horizontally corrugated sheet-metal elements and the panels themselves may form either a single unit of two vertically spaced units 70a, 70b, 71a, 71b in horizontal alignment, as shown, with a vertical stiffening plate 72 on which the adjacent ends of the trough-shaped corrugations are welded in a fluid-tight manner. The side ends of the unitary or double panels are sealed and braced by vertical plates 73 having outwardly bent side edges constituting vertical flanges 74, this U-shaped end element being completed by at least one vertical bar braced beforehand to said flanges 74 and adapted to constitute a reinforcing element of the corresponding vertical post; the U-shaped section constitutes one of the casing elements of the lost shuttering for casting the concrete of said post. Of course, each panel is covered at its top by a flat plate 75 and at its bottom by another similar plate 76, both plates 75, 76 corresponding in width to the thickness of the corrugated sheet-metal panel.

Figure 20:
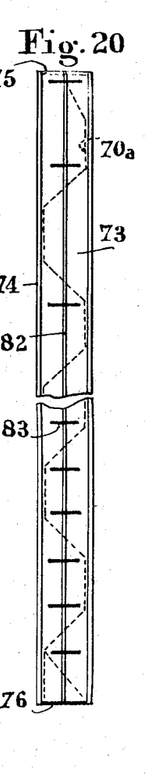
FIGURE 20 is an elevational view showing the plate welded endwise of the panel.
Figure 21:
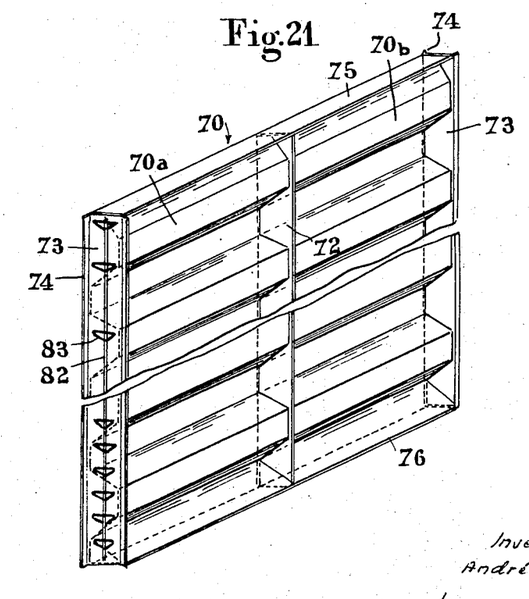
FIGURE 21 is a fragmentary perspective view showing a panel made of two sections.
Figure 22:
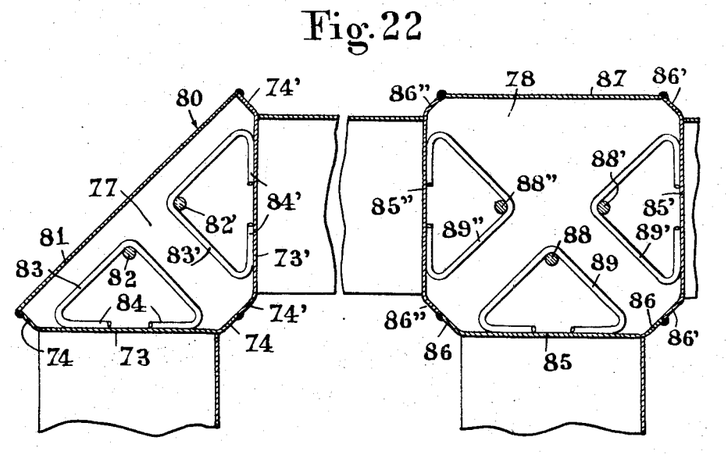
FIGURE 22 is a detail view showing in horizontal section a corner post and an intermediate post of one of the two walls leading to said corner post.
Figure 23:
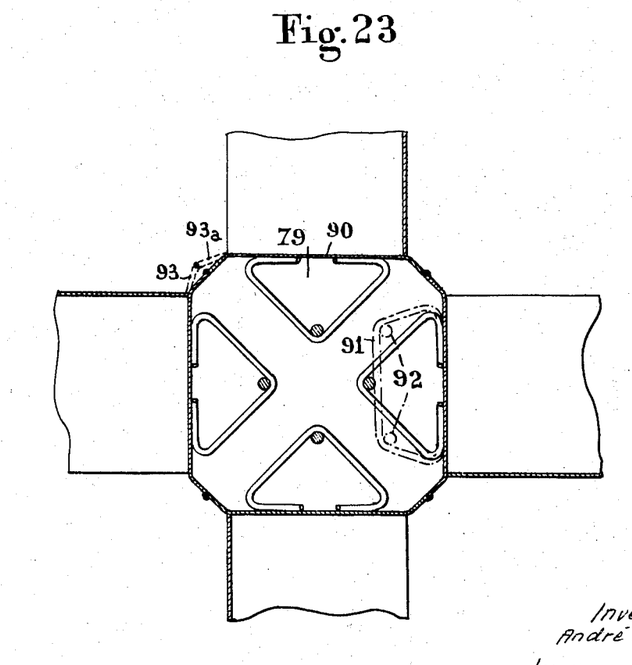
FIGURE 23 is a view similar to FIGURE 22 showing the central post of the main structure.

Three kinds of posts are provided in this form of embodiment, namely the corner posts 77, the side posts 78 intermediate the corner posts (see FIGURE 22), and the central post 79 (FIGURE 23). The corner post 77 is adapted to interconnect two corrugated panels extending at right angles to each other and pertaining to the outer wall of the silo; the corner post shown in FIGURE 22 is disposed as shown on a smaller scale in the upper left-hand corner of FIGURE 17. It comprises a metal sheathing 80 of substantially trapezoidal cross-sectional contour, with vertical bracing faces 74, 73, 74 and 74', 73', 74' secured preferably by welding in abutting relationship and also on the adjacent ends of the corresponding pair of panels to be connected with the corner post, the two adjacent flanges 74, 74' being welded to each other to constitute the minor base of the trapezium, the other or opposite flanges 74 and 74' being interconnected by a vertical plate 81 having its opposite edges welded on the adjacent edges of said flanges 74, 74' respectively, as shown, this vertical outer plate 81 extending substantially at 45° to the adjacent panels and constituting the major base of the trapezium. Vertical reinforcing bars 82, 82' are adapted to be embedded in the concrete mass with which the shuttering 80 is subsequently filled to constitute the post, these bars extending through the whole or part of the height of this post, as desired. These reinforcing bars 82, 82' are preferably welded on transverse reinforcing elements 83, 83' having preferably the form of isosceles triangles, as shown, with a broken base forming side sections 84, 84' welded on the end plates 73, 73' of the corresponding panels. These transverse elements 83, 83' are disposed at spaced intervals along the reinforcing bars 82, 82' as shown in FIGURES 20 and 21.

The intermediate posts 78 are disposed at the junction of each one of the internal crossed panels with the two panels constituting each side wall of the enclosure. This post 78 is shown in horizontal section on a larger scale in the right-hand portion of FIGURE 22. As shown, the metal sheathing or shuttering of this post consists of the U-sectioned end plates 85, 85', 85" of each one of the three panels abutting thereagainst. These plates are identical with plates 73, 73' of post 77 and are welded to one another along their juxtaposed flanges 86, 86', 86" to constitute a kind of trough-shaped element having its aperture sealed by the vertical plate 87 welded along its edges on the edges of the corresponding flanges 86', 86". The sheathing or shuttering of post 78 has therefore substantially the shape of a square-sectioned prism with bevelled longitudinal edges. Vertical reinforcing bars 88, 88', 88" similar to bars 82, 82' of post 77 are provided and adapted to be embedded in the concrete mass subsequently cast into the post casing, and transverse reinforcing elements 89, 89', 89" similar to elements 83, 83' of post 77 are welded in the same manner on reinforcing bars 88, 88', 88", respectively as well as on the end plates of the corresponding panels.

The central post 79 shown in cross section and on a larger scale in FIGURE 23 has a sheathing shuttering or casing differing from that of post 78 described hereinabove only in that the plate 87 is replaced by the end plate 90 of the fourth panel connected to the other three of identical structure, since this post is the crossing point of the two central dividing partitions, that is, of the four panels dividing the silo into four compartments or cells. On the other hand this sheathing is the same as that shown in FIGURE 15 concerning the first form of embodiment. This post comprises for reinforcing the concrete to be cast into the sheathing four vertical bars similar to those of post 78, transverse members, also of triangular configuration, similar to those of said posts, being also welded to said vertical reinforcing bars and to the corresponding end plates of the panels.

However, in FIGURE 23 there is shown in broken lines by way of variation an alternate shape of a transverse reinforcing element adapted to be substituted for the three types of triangular transverse members contemplated heretofore, provided that each transverse reinforcing element is associated with two vertical reinforcing bars instead of the single central bar illustrated in the other examples. This transverse reinforcing element 91 of trapezoidal configuration has an open or split major base having its free ends welded on the end plates of the corresponding metal panels, the minor base of each element 91 being welded on the vertical reinforcing bars 92 disposed at the upper corners of the trapezium. On the other hand, the irons for interconnecting the vertical bars 82, 82' and 88, 88', 88" to plates 73, 73' and 85, 85', 90 and also if desired 80 and 87 may have any other suitable configuration.

In the diagrammatic arrangement illustrated in FIGURE 17 it is assumed that the aggregate silo structure comprises four compartments or cells, but it will be readily understood that this structure may comprise a greater number of similar cells added to one or more of its four vertical sides in this FIGURE 17. It is assumed that the structure could be extended on the right-hand side, as shown by the broken lines corresponding to the initial portions of the additional metal panels, the corner posts 77 of this side being replaced with intermediate posts 78, the intermediate post 78 of this figure being replaced in turn with another central post 79.

It is clear that these various arrangements are applicable to containers not only of square configuration but also of any other polygonal shape.

Similarly, the cross sectional configuration of the posts may differ from the shapes illustrated. Thus, FIGURE 23 shows in broken lines longitudinal flanges or bent marginal portions 93, 93a which may be provided with a view to increase the cross-sectional area of the posts.

For instance, in the case of rectangular containers, the post 78 of FIGURE 17 would be disposed between only two walls, and post 79 between two partitions instead of four.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

What I claim is:

1. A large upright container having a plurality of compartments and comprising, in combination, a substantially continuous outer wall of concrete; a plurality of inner substantially vertical sheet metal panels extending transverse to said outer wall and dividing said container into said plurality of compartments, said panels being formed at least in part with horizontally extending corrugations; substantially horizontal hook-shaped projections fixed to said panels and projecting beyond the side edges thereof facing said outer wall and being embedded in the latter; and at least one concrete post between and supporting the other side edges of said panels.

2. A container as defined in claim 1, wherein said hook-shaped projections are constituted by metal bars welded at one end portion thereof to the respective panel.

3. A container as defined in claim 1, wherein each of said panels comprises at least along one of the side edges thereof a transverse plate fixed thereto and forming part of a form for casting the concrete post adjacent said side edge.

4. A container as defined in claim 3, wherein said transverse plate has a plate-shaped projection embedded in the concrete of the respective post.

5. A container as defined in claim 1, wherein each of said panels comprises at least in the region of one of the side edges thereof a transverse plate forming part of a form for casting a concrete post adjacent thereto, said transverse plate being fixed to said panel and extending in substantially vertical direction inwardly spaced from said side edge thereof and being at least in part housed within said corrugations of said panel, the portion of the panel projecting beyond said transverse plate being embedded in the respective concrete post.

6. A container as defined in claim 1, wherein each panel leading to said outer wall has in the region of opposite side edges thereof transverse plates fixed thereto and extending in substantially vertical direction inwardly spaced from the respective side edge and being at least in part housed within the corrugations of the panel, one of the plates forming part of a form for casting the outer wall adjacent one edge of the panel and the other plate forming part of a form for casting the concrete post adjacent thereto, the portions of the panel projecting beyond the plates being respectively embedded in the concrete of said outer wall and in that of said post.

7. A container as defined in claim 1, wherein said post is formed from reinforced concrete and wherein each panel comprises along the side edges thereof facing the post a transverse plate fixed thereto and forming part of a form for casting said post, and reinforcing bars fixed to said panel and extending beyond said side edge thereof and being embedded in the concrete of said post so as to form part of the reinforcement of the latter.

8. A large upright container having an outer substantially vertical and substantially continuous wall and a plurality of substantially vertical dividing walls dividing the interior of said container into a plurality of compartments, each of said walls being formed from horizontally corrugated sheet metal panels having side edges spaced from side edges of adjacent panels; a pair of substantially vertical metal plates respectively extending along and being fixed to opposite side edges of each panel substantially normal thereto and forming part of an enclosure for a concrete post; and at least one vertical reinforcing bar attached to each plate spaced therefrom and forming at least part of the reinforcement of the respective concrete post; and concrete filling said enclosure and embedding said reinforcing bar to form between spaced side edges of adjacent panels reinforced concrete posts connected to said panels.

9. A container as defined in claim 8, wherein each of said plates has along opposite side edges thereof outwardly inclined flanges, at least one of which extends toward the side edge of a corresponding flange on the plate fixed to the side edge of the adjacent panel, said flanges also forming part of said form and said reinforcing bars being respectively located in the space between said flanges.

10. A container as defined in claim 8, wherein each of said panels is formed from at least two sections connected to each other along adjacent side edges of said sections by a vertical transverse plate welded to said adjacent side edges of said sections.

11. A container as defined in claim 9, wherein said outer wall of said container has a polygonal shape, and wherein the posts located at the corners of said polygonal outer wall are of substantially trapezoidal cross-section, the flanges on the plates of the panels extending from the respective corner posts which project toward each other are welded together along the outer edges thereof and form together the minor base of the trapezium, and the other flanges of said plates being welded along their edges to a vertical sheet metal strip extending therebetween and forming the major base of said trapezium, said vertical reinforcing bar for each plate being connected to the respective plate by a plurality of substantially triangular reinforcing elements respectively located in substantially horizontal planes vertically spaced from each other and welded at their bases to the respective plate.

12. A container as defined in claim 9, wherein at least one intermediate post is located between two corner posts and at the junction of a dividing wall with said outer wall, wherein the edges of the flanges on the plate of the panel forming at least part of said dividing wall are welded to corresponding edges of the flanges on the plates on the panels forming part of said outer wall, and including an elongated metal strip extending between and being welded to the other edges of the flanges on the plates on the panels forming the outer wall, said vertical reinforcing bar for each plate being connected to the respective plate by a plurality of substantially triangular reinforcing elements respectively located in substantially horizontal planes vertically spaced from each other and welded at their bases to the respective plate.

13. A container as defined in claim 8, wherein said container includes at least one inner concrete post at the junction of panels forming dividing walls, the plates on the side edges of said panels adjacent said inner post being welded along edges thereof to each other to form a substantially quadrangular hollow prism serving as a form for said inner concrete post and being filled with concrete, said vertical reinforcing bar for each plate being connected to the respective plate by a plurality of substantially triangular reinforcing elements respectively located in substantially horizontal planes vertically spaced from each other and welded at their bases to the respective plate.

References Cited

UNITED STATES PATENTS 704,805 7/1902 Jamieson _____________ 52—197
1,982,217 11/1934 Luehrs _____________ 52—432

FOREIGN PATENTS 618,987 1926 France.
796,736 1958 Great Britain.

JOHN E. MURTAGH, *Primary Examiner.*